US012002073B2

(12) United States Patent
Kawakami et al.

(10) Patent No.: US 12,002,073 B2
(45) Date of Patent: Jun. 4, 2024

(54) INFORMATION DISPLAY TERMINAL, INFORMATION TRANSMISSION METHOD, AND COMPUTER PROGRAM

(71) Applicant: DWANGO Co., Ltd., Tokyo (JP)

(72) Inventors: Nobuo Kawakami, Tokyo (JP); Yuri Odagiri, Tokyo (JP); Takashi Kojima, Tokyo (JP); Keisuke Ogaki, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 203 days.

(21) Appl. No.: 17/263,777

(22) PCT Filed: Sep. 25, 2019

(86) PCT No.: PCT/JP2019/037581
§ 371 (c)(1),
(2) Date: Jan. 27, 2021

(87) PCT Pub. No.: WO2020/090298
PCT Pub. Date: May 7, 2020

(65) Prior Publication Data
US 2021/0264476 A1 Aug. 26, 2021

(30) Foreign Application Priority Data

Oct. 31, 2018 (JP) ................................. 2018-215064

(51) Int. Cl.
G06Q 30/02 (2023.01)
G06F 3/01 (2006.01)
(Continued)

(52) U.S. Cl.
CPC ......... G06Q 30/0273 (2013.01); G06F 3/013 (2013.01); G06Q 30/0267 (2013.01)

(58) Field of Classification Search
CPC ...... G06F 3/0487; G06F 16/951; G06F 3/013; G06Q 30/0267; H04N 1/00278; G10L 15/26; G09G 5/02; G09G 5/377
See application file for complete search history.

(56) References Cited

U.S. PATENT DOCUMENTS

2005/0108092 A1* 5/2005 Campbell .............. A61B 3/113
705/14.69
2014/0132511 A1* 5/2014 Ahn ....................... G06F 3/0487
345/158

(Continued)

FOREIGN PATENT DOCUMENTS

AU 2017236782 A 9/2018
CA 3017795 A1 9/2017

(Continued)

OTHER PUBLICATIONS

English translation of Decision of Refusal for JP Application No. 2018- 215064, dated Nov. 28, 2019.

(Continued)

Primary Examiner — Saba Dagnew
(74) Attorney, Agent, or Firm — Dorsey & Whitney LLP

(57) ABSTRACT

It is very useful for advertisers of banner ads or owners of websites when browsing information such as where on a website an individual is viewing can be collected. However, such browsing information is personal information that is difficult to be collected. Provided are an information display terminal, an information transmission method and a computer program in which there is a storage for presenting a message indicating that a reward to be paid if the viewer permits collection of browsing information, and storing an electrical message of permission as evidence when the viewer gives permission. When attributes (age, gender, occupation, type of industry, family structure etc.) of a viewer are collected under agreement in obtaining permis- (Continued)

sion of collection of information from the viewer and stored in a user information storage, the browsing information becomes higher value-added.

22 Claims, 10 Drawing Sheets

(51) Int. Cl.
*G06Q 30/0251* (2023.01)
*G06Q 30/0273* (2023.01)

(56) References Cited

U.S. PATENT DOCUMENTS

| | | | | |
|---|---|---|---|---|
| 2014/0247208 | A1* | 9/2014 | Henderek | G06F 3/0487 |
| | | | | 345/156 |
| 2014/0300535 | A1* | 10/2014 | Kim | G06F 3/013 |
| | | | | 345/156 |
| 2015/0035747 | A1* | 2/2015 | Shimizu | H04N 1/00278 |
| | | | | 345/156 |
| 2017/0053304 | A1* | 2/2017 | Eskilsson | G06F 16/951 |
| 2017/0169794 | A1* | 6/2017 | Nagano | G09G 5/02 |
| 2017/0243063 | A1* | 8/2017 | Kaneko | G06V 40/20 |
| 2017/0278122 | A1 | 9/2017 | Kaehler | |
| 2019/0033966 | A1* | 1/2019 | Odagiri | G09G 5/377 |
| 2019/0139099 | A1* | 5/2019 | Dey | G06Q 30/0275 |
| 2019/0377932 | A1* | 12/2019 | Alameh | H04N 21/4661 |

FOREIGN PATENT DOCUMENTS

| | | |
|---|---|---|
| CN | 1370296 A | 9/2002 |
| CN | 109154983 A | 1/2019 |
| EP | 3433707 A1 | 1/2019 |
| JP | 2002109178 A | 4/2002 |
| JP | 2007199950 A | 8/2007 |
| JP | 2008040884 A | 2/2008 |
| JP | 2014067401 A | 4/2014 |
| JP | 2014209320 A | 11/2014 |
| JP | 2015060580 A | 3/2015 |
| JP | 2015092357 A | 5/2015 |
| JP | 2015118632 A | 6/2015 |
| JP | 2016046730 A | 4/2016 |
| JP | 2016186730 A | 10/2016 |
| JP | 2019512793 A | 5/2019 |
| KR | 20180120274 A | 11/2018 |
| WO | 2017165231 A1 | 9/2017 |

OTHER PUBLICATIONS

English translation of Decision to Grant a Patent for JP Application No. 2018-215064, dated Jun. 12, 2020.
International Search Report and Written Opinion for Application No. PCT/JP2019/037581, dated Nov. 26, 2019.
English translation of Notice of Reasons for Refusal for JP Application No. 2018-215064, dated Jul. 16, 2019.
[English translation] The First Office Action for Chinese Patent Application No. 201980047571.1, mailed on Dec. 25, 2023, pp. all.

* cited by examiner

FIG.5

(REGISTRATION INFORMATION ON VIEWER)

| ACCOUNT NUMBER | NO. 123456 | FAMILY | SPOUSE, TWO MALES, ONE FEMALE |
|---|---|---|---|
| BIRTH YEAR, GENDER | 1979, MALE | HOBBIES | FISHING, CAMPING |
| INDUSTRY, DEPARTMENT | PHARMACEUTICAL MANUFACTURING AND SALES, SALES DEPARTMENT | FACIAL RECOGNITION DATA NO. | NO. 123456 |

(VIEWING POINT INFORMATION)

| ACCOUNT NUMBER | ACCESS DATE | TIME: HH/MM/SS | URL | COORDINATES X AND Y OF VIEWING POINT |
|---|---|---|---|---|
| NO. 123456 | 2018.8.1 | 07:01:00 | https://XXX | 200, 450 |
| NO. 123456 | 2018.8.1 | 07:01:05 | https://XXX | 50, 320 |
| NO. 123456 | 2018.8.1 | 07:01:10 | https://XXX | 50, 320 |
| NO. 123456 | 2018.8.1 | 07:01:15 | https://XXX | 50, 320 |
| NO. 123456 | 2018.8.1 | 07:01:20 | https://XXX/YY | 100, 31 |

INFORMATION DISPLAY TERMINAL, INFORMATION TRANSMISSION METHOD, AND COMPUTER PROGRAM

RELATED APPLICATIONS

This application is a 371 National Stage application claiming priority to International Application No. PCT/JP2019/037581, filed Sep. 25, 2019, which claims priority to Japanese Patent Application No. 2018-215064 filed on Oct. 31, 2018. The aforementioned applications are incorporated herein by references, in their entirety, for any purposes.

TECHNICAL FIELD

The present disclosure relates to an information display terminal, all information transmission method, and a computer program that are suitable for a system collecting web browsing information on users.

BACKGROUND ART

Some techniques have been suggested as the prior art. From an image captured around eyeballs of a user viewing information terminal (i.e., a personal digital assistant (PDA)) such as a smartphone or a personal computer, the current orientation of the eyeballs of this user is detected. Together with the information displayed currently on this information terminal, the information on the specific content displayed on this information terminal and currently focused on by the user is obtained.

For example, the following Patent Document 1 discloses utilizing eye information on a viewer of a display screen providing broadcast service for moving bodies such as mobile phones and car navigation systems to measure the quality of view based on "how programs are viewed" which is impossible to be known from typical audience ratings.

Similarly, the following Patent Document 2 discloses a system that specifies a temporal attention point of a first user in a content (e.g., a moving image), and outputs attention time information indicating the specified temporal attention point in association with the content information and the attention point information. The system plays and displays the content (e.g., the moving image) on a display viewed by a second user so that the temporal attention point based on the attention time information and the spatial attention point based on the attention point information, which are output together with the content information, are distinguished from each other under a common indicator. As a result, the second user efficiently grasps the temporal and spatial attention points of the first user in the content.

In addition as an eye detection technique that is a basic technique of obtaining eye information on such users, the following Non-Patent Document 1 discloses a modification of a calibration technique for each person when imaging eyeballs and calculating the eye direction. Similarly, the following Patent Document 3 discloses a technique of improving the detection accuracy under a genetic algorithm using an image template when imaging eyeballs and detecting the eye direction.

The following Non-Patent Document 2 shows that eye tracking image data (hereinafter referred to as "GazeCapture") in a frame of 2.5 mega or more is collected from 1450 or more targets. Using this GazeCapture, a mobile information terminal, such as a smartphone, mounting no particular sensor is trained by "iTracker" that is a deep neural network for eye tracking to perform eye tracking at an accuracy of 1.71 cm or less.

CITATION

PATENT DOCUMENTS

Patent Document 1: Japanese Unexamined Patent Publication No. 2009-5094
Patent Document 2: Japanese Unexamined Patent Publication No. 2017-228197
Patent Document 3: Japanese Unexamined Patent Publication No. 2013-45151

NON-PATENT DOCUMENTS

Non-Patent Document 1: Takehiko Ohno, Naoki Mukawa, and Atsushi Yoshikawa "Eye Tracking Method Based on Eyeball Shape Models", Eighth Image Sensing Symposium, pp. 307 to 312 (2002)
Non-Patent Document 2: Kyle Kratka et al.; "Eye Tracking for Everyone", CVPR 2016, http://gazecapture.csail.mit.edu/

SUMMARY OF THE INVENTION

Technical Problem

With a wide spread of the interact, various trades are made on websites and products or services are sold on the websites. There seems thus an increasing importance of recording browsing histories of websites as basic information to know the interests and preferences of viewers, that is, purchasers. Hence, there will an increasing demand by companies doing their business somehow utilizing websites or individuals making individual trades on websites for higher value-added, fine, accurate web browsing information.

In addition, if being available based on a large number of viewers, such web browsing information is expected to be applied at a high level through data mining.

However, detailed browsing information such as where on a website an individual is viewing is personal information that is difficult to be collected and utilized without the agreement of the viewer. On the other hand, as described above, it is important to obtain such browsing information on a large number of people. It is thus troublesome and not practical that an information collector obtains permission of a viewer (i.e., a user) to collecting the web browsing information, which is personal information, at each time of viewing.

From the standpoint of a viewer (i.e., a user) who provides the information, providing his/her own browsing information to a third party is a mere disadvantage, not an advantage at all. In this point of view as well, collecting the information is difficult.

On the other hand, if attributes (e.g., gender, age, or occupation) of viewers are attached, the web browsing information is widely applicable among companies demanding business applications.

The present invention was made under the circumstances described above. It is an object of the present invention to provide an information display terminal, an information transmission method, and a computer program that smoothly collect a large amount of information (i.e., eye tracking information)—although being personal information—as to where in a displayed content is specifically focused on by a viewer viewing distributed information displayed particularly on a web browsing device in a changeable manner from moment to moment, together with the information on the attributes of the viewer.

Solution to the Problem

In order to achieve the object, the present invention provides the information display terminal, the information transmission method, and the computer program in the following 1) to 10).

1) An information display terminal includes:
(A) a display screen;
(B) a gaze point detector configured to detect a gaze point position of an operator of the information display terminal on the display screen; and
(C) an output unit configured to output, to a predetermined destination, information specifying a content displayed on the display screen in association with a result of detection of the gaze point position. The information display terminal further includes:
a query signal receiver and responder configured to receive a query signal and transmit an answer to the query signal in accordance with an operation by the operator, the query signal requiring, of the operator, permission to execute a function of (C) the output unit by the information display terminal on condition of payment of reward to the operator of the information display terminal.

2) The information display terminal of 1) further includes:
a second transmitter configured to transmit information on an attribute of the operator who has permitted in response to the query signal.

3) An information transmission method includes:
(A) displaying a content using a display screen of an information display terminal;
(B) detecting a gaze point position of an operator of the information display terminal on the display screen using a gaze point detector of the information display terminal; and
(C) outputting, to a predetermined destination, information specifying the content display on the display screen in association with a result of detection of the gaze point position using an output unit of the information display terminal. The information transmission method further includes:
receiving a query signal and transmitting an answer to the query signal in accordance with an operation of the operator using a query signal receiver and responder of the information display terminal, the query signal requiring, of the operator, permission to execute (C) the outputting from the output unit by the information display terminal on condition of payment of reward to the operator of the information display terminal.

4) The information transmission method of 3) further includes:
transmitting information on an attribute of the operator who has permitted in response to the query signal using a second transmitter of the information display terminal.

5) A computer program for executing the steps of the information transmission method of 3) or 4).

6) An information display terminal includes:
(A) a display screen;
(B) a gaze point detector configured to detect a gaze point position of an operator of the information display terminal on the display screen; and
(C) an output unit configured to output, to a predetermined information specifying a content displayed on the display screen in association with a result of detection of the gaze point position. The information display terminal further includes:
a permission action processor configured to store information indicating a fact that the operator has permitted, in advance, to outputting the information to the predetermined destination by the output unit, or transmit the information indicating the fact outside the information display terminal.

7) The information display terminal of 6) further includes:
the information output to the predetermined destination by the output unit includes information on an attribute of the operator.

8) An information transmission method including:
(A) displaying a content using a display screen of an information display terminal;
(B) detecting a gaze point position of an operator of the information display terminal on the display screen using a gaze point detector of the information display terminal; and
(C) outputting, to a predetermined destination, information specifying the content displayed on the display screen in association with a result of detection of the gaze point position using an output unit of the information display terminal. The information transmission method further includes:
storing information indicating a fact that the operator has permitted, in advance, to outputting the information to the predetermined destination by the output unit, or transmitting information indicating the fact outside the information display terminal using a permission action processor of the information display terminal.

9) The information transmission method of 8) further includes:
the information output to the predetermined destination by the output unit includes information on an attribute of the operator.

10) A computer program for executing the steps of the information transmission method of 8) or 9).

Advantages of the Invention

With the configurations described above, the present invention provides an information display terminal, an information transmission method, and a computer program that smoothly collect a large amount of information, although being personal information, as to where in a displayed content is specifically focused on by a viewer viewing delivered information displayed particularly on a web browsing device in a changeable manner from moment to moment, together with the information on the attributes of the viewers.

BRIEF DESCRIPTION OF THE DRAWINGS

FIG. 5 is an example recording form used by the viewing point information collecting system in FIG. 3.

DESCRIPTION OF EMBODIMENTS

[Situation 1 of Suitably Applying Embodiments of Present Invention]

Prior to describing embodiments of the present invention, some situations will be described to which the embodiments are suitably applicable.

Figure 1:
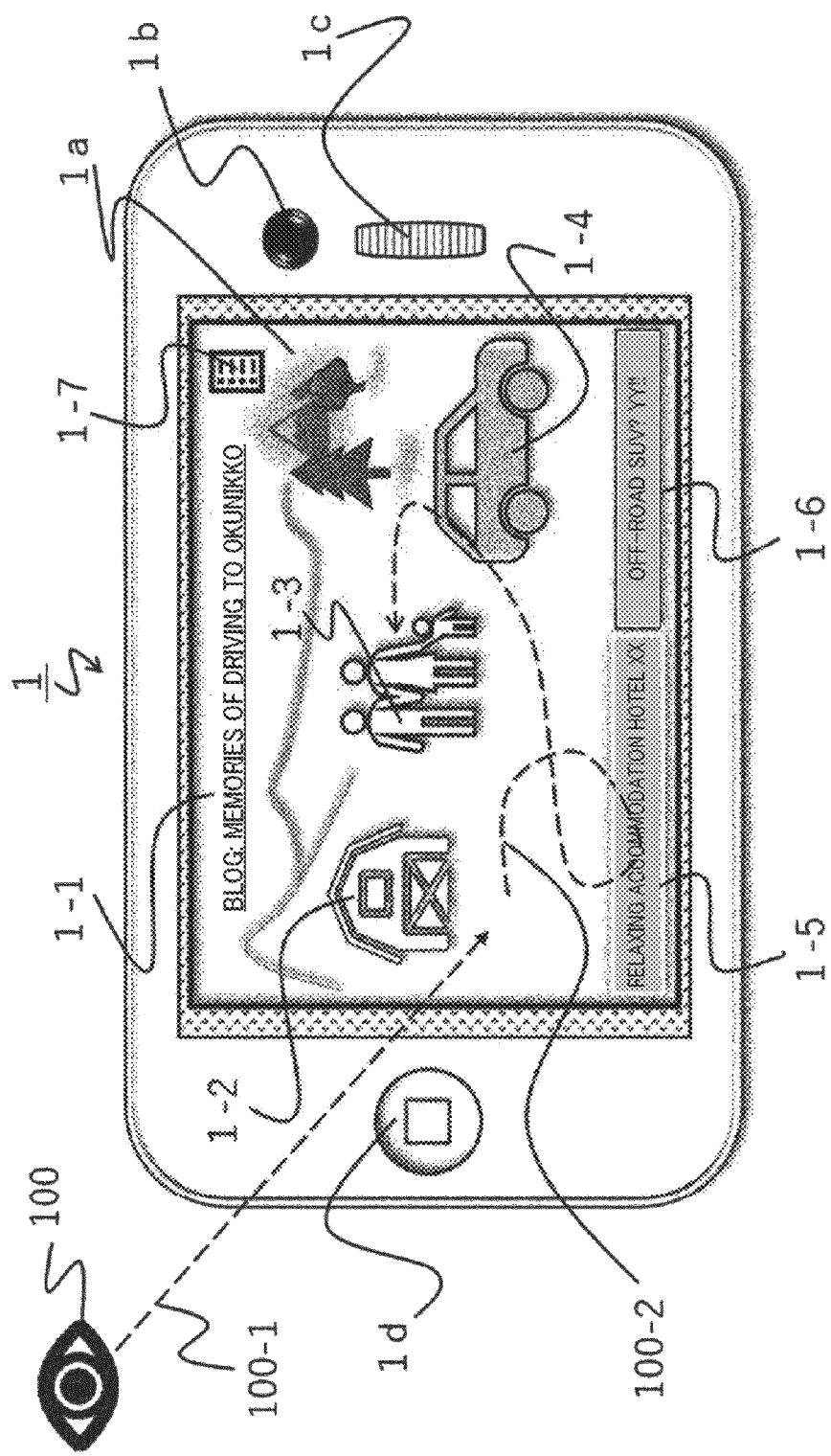
FIG. 1 schematically shows a display screen of a smartphone as a situation of suitably applying a viewing point information collecting system according the present invention.

FIG. 1 schematically shows a display screen of a smartphone as a situation of suitably applying a viewing point information collecting system according the present invention.

FIG. 1 schematically shows a situation in which a smartphone displays a blog page screen of an individual.

A smartphone 1 includes a display panel 1*a*, a front-facing camera 1*b*, a speaker 1*c*, and a home button 1*d*. The front-facing camera 1*b* has a view for imaging a user of (i.e., a viewer of a website on) the display panel 1*a*.

The front-facing camera 1*b* is one of those mounted in a lot of smartphones or mobile phones initially for video conversation (e.g., video conferences or video calls) or capturing self-portrait images (selfies) and compared to rear-facing cameras (not shown), which faces opposite to the user to image surroundings.

The display panel 1*a* displays a home page 1-1 of a blog "Memories of Driving to Okunikko" created by a blogger 1-3. The home page 1-1 displays images of a hotel 1-2 in which the blogger stayed, the blogger 1-3, a car 1-4, a first banner ad 1-5 "Relaxing Accommodation Hotel XX", and a second banner ad 1-6 "Off-Road SUV? YY!!".

Each viewer browsed and visited this home page 1-1 clicks a displayed menu button 1-7 and selects an item to be viewed, from the home page 1-1, another sub-page such as a page showing pictures or diary.

As will be described later, where on the display panel 1*a* and eye 100 of a viewer is viewing, that is, an eye track 100-2 on the display panel 1*a* in a line 100-1 of sight is known by the embodiments of the present invention.

In the prior art, the blogger 1-3 recognizes that some has browsed and visited this home page 1-1 but where on the home page 1-1 the viewer paid attention is unknown. By contrast, the eye track 100-2 is known in the embodiments of the present invention. The blogger knows where on the home page 1-1 designed and produced by him/herself has attracted people or drawn attention so that the work for the blog pays off. If an item expected to gain page views at a high rate unexpectedly draws little attention, the blogger may move this item to the home page or add a comment such as "Look this too!" on the item to the diary to draw attention.

Individual viewers browse and visit the home page 1-1 of this blog from various reasons. Some viewers visit the blog because they know the blogger 1-3 personally. Others have not known this blogger before but are familiar with or interested in the location "Okunikko". Such viewers may, for a long time, pay attention to or gaze at the pictures, of views or the hotel 1-2 in which the blogger has stayed, posted on the home page 1-1. Others may have not known the blogger 1-3 and may have been interested less in the location "Okunikko" but much in the car 1-4 used by the blogger 1-3 during the trip. Such people may have payed attention to the pictures of this car for a long time and read the diary of the blogger on the car 1-4. The blogger 1-3 grasps an eye track 100-2 of each of such individual viewers, refers to the tracks in further creating the blog, and modifies the blog to gain a larger number of page views.

On the other hand, this blogger 1-3 makes a contract with an internet advertising agency or an internet service provider and places the two banner ads 1-5 and 1-6 on his home page 1-1. Under advertisement contracts, advertisers pay the blogger 1-3 for the amounts depending on the number of visits to this home page 1-1 by viewers (i.e., third parties) on a pay-per-view basis in most cases.

From an advertiser's point of view, it is unclear in the prior art how much attention was paid to the own company's advertisement by the viewer. By contrast, it is clear from the embodiments of the present invention whether attention was actually paid to the banner ad of the own company, since the eye track 100-2 of the viewer is obtained first. As a result, the effects and advantages of posting the banner ad of the own company on this home page 1-1 are known. As will be described later the eye track 100-2 with the attributes of the viewer is obtained in the embodiments of the present invention. For example, for an auto manufacturer, the own company's banner ad "Off-Road SUV? YY!!" certainly draws attention of some viewers but the attributes of the viewers who are not necessarily the best purchasers of the vehicles. The attributes can thus be used for determining whether the banner ad of the own company is to be continuously placed on this home page 1-1.

[Situation 2 of Suitably Applying Embodiments of Present Invention]

Figure 2:
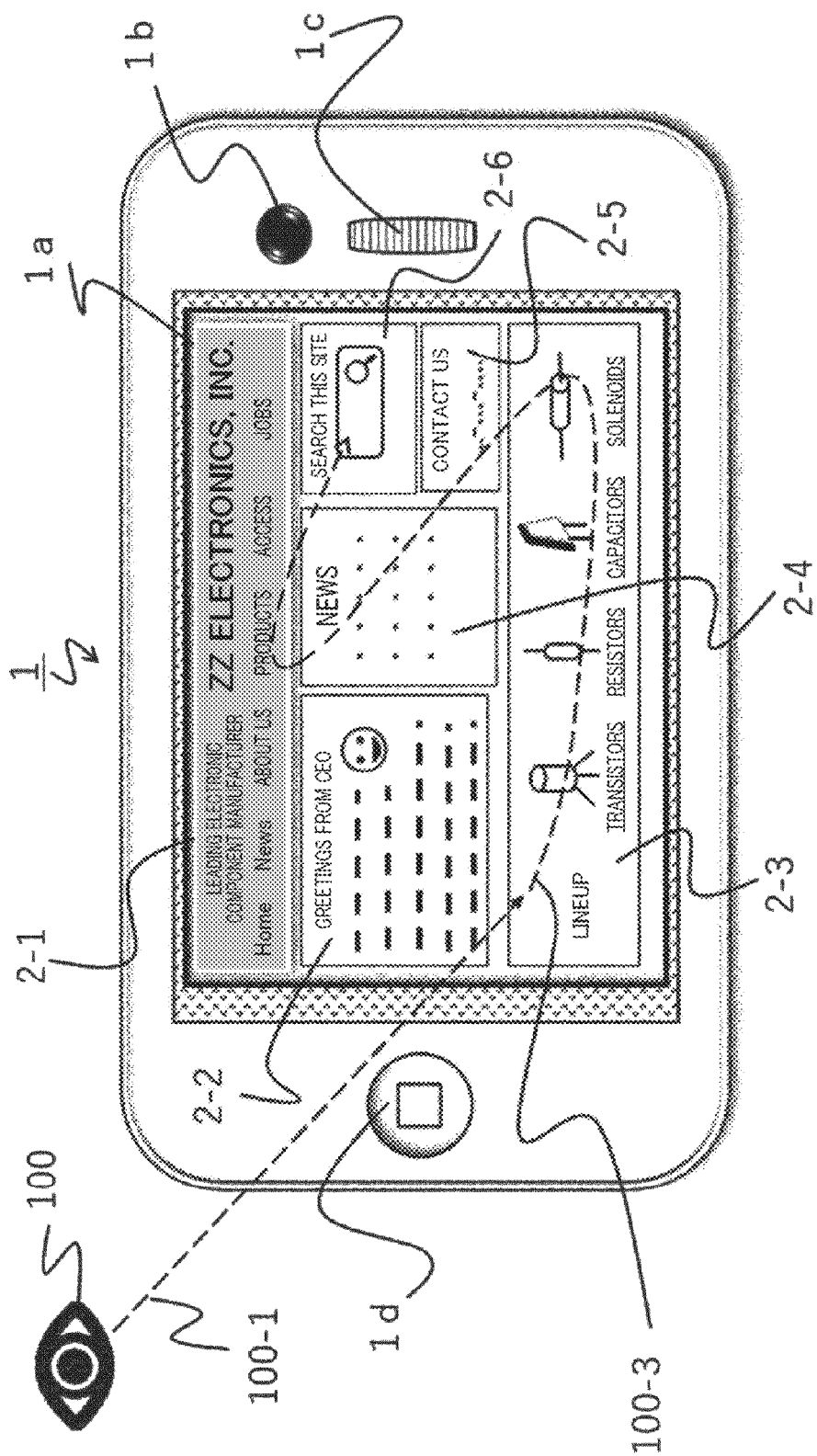
FIG. 2 schematically shows another display screen of a smartphone as another situation of suitably applying the viewing point information collecting system according the present invention.

FIG. 2 schematically shows a display screen of a smartphone as a situation of suitably applying a viewing point information collecting system according the present invention. FIG. 2 schematically shows that the smartphone 1 displays a website like in FIG. 1. The smartphone displays not an individual blog like in FIG. 1 but a portal home page 2-1 of a company named "ZZ Electronics, Inc."

The home page 2-1 includes some display frames, namely, a frame 2-2 "GREETINGS FROM CEO", a frame 2-3 "LINEUP", a frame 2-4 "NEWS", a frame 2-5 "CONTACT US", and a frame 2-6 "SEARCH THIS SITE".

The company showing this home page 2-1 expect browsing and visits of as many as possible viewers. For example, if a large number of viewers focus on frame 2-2 "GREETINGS FROM CEO" first, the company determines that various activities (e.g., lectures, educations, and publications) by this CEO in the industry gain page views, and further intensifies the activities. If the frame "NEWS" draws much attention, the past news needs to be analyzed to know what kind of news draw attention.

Assume that a viewer who has browsed and visited the home page 2-1, looked around on the frame 2-3 "LINEUP", clicked the button "PRODUCTS" above the header frame 2-1 and viewed the sub-page but have not achieved his/her purpose. At the end, the viewer searched the frame 2-6 "SEARCH THIS SITE" for the part name "thyristor", for example. In this case, the following is found. This viewer actually searched for thyristors of this electronic component manufacturer but did not achieve the purpose and failed to find the thyristors on the sub-page "PRODUCTS", since no thyristor is listed in the frame 2-3 "LINEUP" of the home page 2-1. If it is found from the attributes of this viewer that the viewer is "actively engaged in product development in a home appliance manufacturer, there was a great loss of business opportunities. It is found that there is a need to modify how to display the product lineup on the home page 2-1 as soon as possible, which significantly contributes to the company's business.

[First Embodiment: Push Information Collection]

Now, a viewing point information collecting system 3 according to a first embodiment of the present invention will be described with reference to FIGS. 3 to 7. This system 3 collects the information on the gaze point of the user of the smartphone 1 in web browsing using dedicated application software (hereinafter referred to as a "dedicated app") installed on the smartphone 1.

Figure 3:
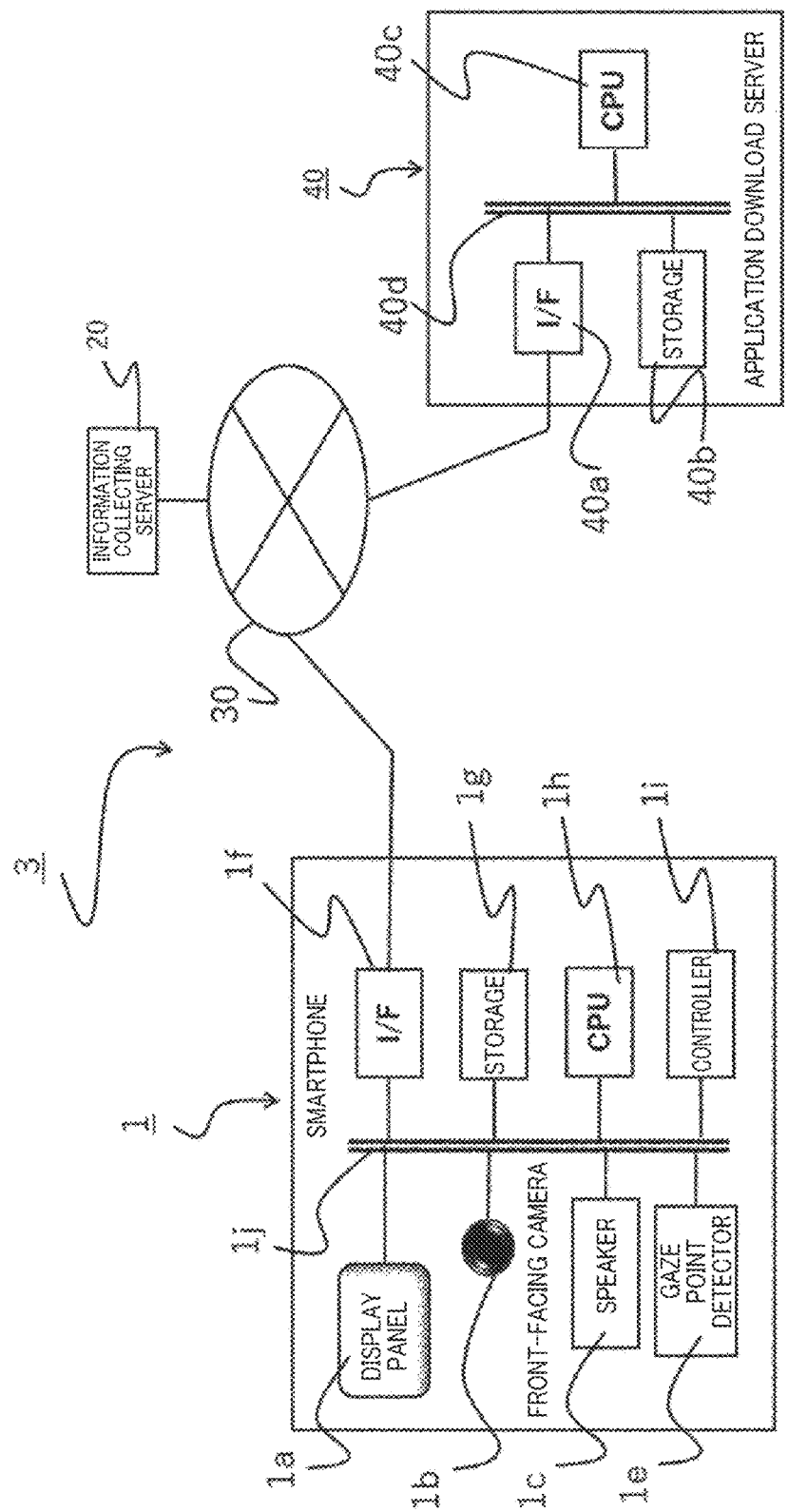
FIG. 3 is a configuration diagram of a viewing point information collecting system according to an embodiment of the present invention.

FIG. 3 is a configuration diagram of a viewing point information collecting system according to an embodiment of the present invention. As shown in the configuration of FIG. 3, the viewing point information collecting system 3 includes the smartphone 1, an information collecting server 20, and an application download server 40 that are connected to each other via an internet communication network 30 to allow data exchange. While only one smartphone 1 is shown in the figure, a plurality of smartphones are included in an actual operation.

The smartphone 1 is a general-purpose smartphone with the following configuration after downloading and installing dedicated apps from the application download server 40.

Specifically, the display panel 1a of the smartphone 1 displays contents of the pages on a website described above with respect to FIGS. 1 and 2. As described above, the front-facing camera 1b captures a web viewer who is the user of the smartphone 1, particularly captures images around the eyeballs of the user to allow detection of the eye direction of the viewer. The speaker 1c registers viewers using a dedicated app or uses for utterance of instruction information on operation when transmitting the viewing point information from this smartphone 1 to the server 20 after the registration.

The gaze point detector 1e detects the eyes of the viewer based on the images around the eyeballs of the viewer captured by the front-facing camera 1b to generate values of a coordinate of the point of view on the display panel 1a in this line of sight. As a specific eye detection method, Non-Patent Document 1 described above or any other known information may be employed. An interface 1f is for information reception and transmission inside and outside the smartphone 1.

Note that the gaze point detector 1e may not detect the eye of the viewer using images around the eyeballs. Instead, as described above in Non-Patent Document 2, the detector may detect the eyes of the viewer of a smartphone or the point of view in the line of sight through machine learning or a neural network with stored data on eye tracking using a mobile information terminal, such as a smartphone not equipped with any special sensor.

A storage 1g readably stores various application programs including operating system programs and browsing programs for various operations of the smartphone 1, and stores dedicated apps for collecting viewing point information. A central processing unit (CPU) 1h controls various operations performed by the smartphone 1. A controller 1i is specifically, the home button 1d or a touch sensor of the display panel 1a, or may be a user interface functional unit that recognizes, for use, the voice of the viewer picked up by a microphone (not shown). These components are connected to each other by a bus line 1j to allow data exchange.

The application download server 40 stores not only the dedicated apps for the gaze point information collection but also various applications that are available on the smartphone 1 and downloads the applications upon request by the smartphone 1. The server includes interface 40a, a storage 40b, and a CPU 40c. The interface 40a controls data transfer inside or outside server 40. The storage 40b stores various applications. The CPU 40c controls various operations of the server 40. These components are also connected to each other by a bus line 40d to allow data exchange.

(Configuration of Information Collecting Server 20)

Figure 4:
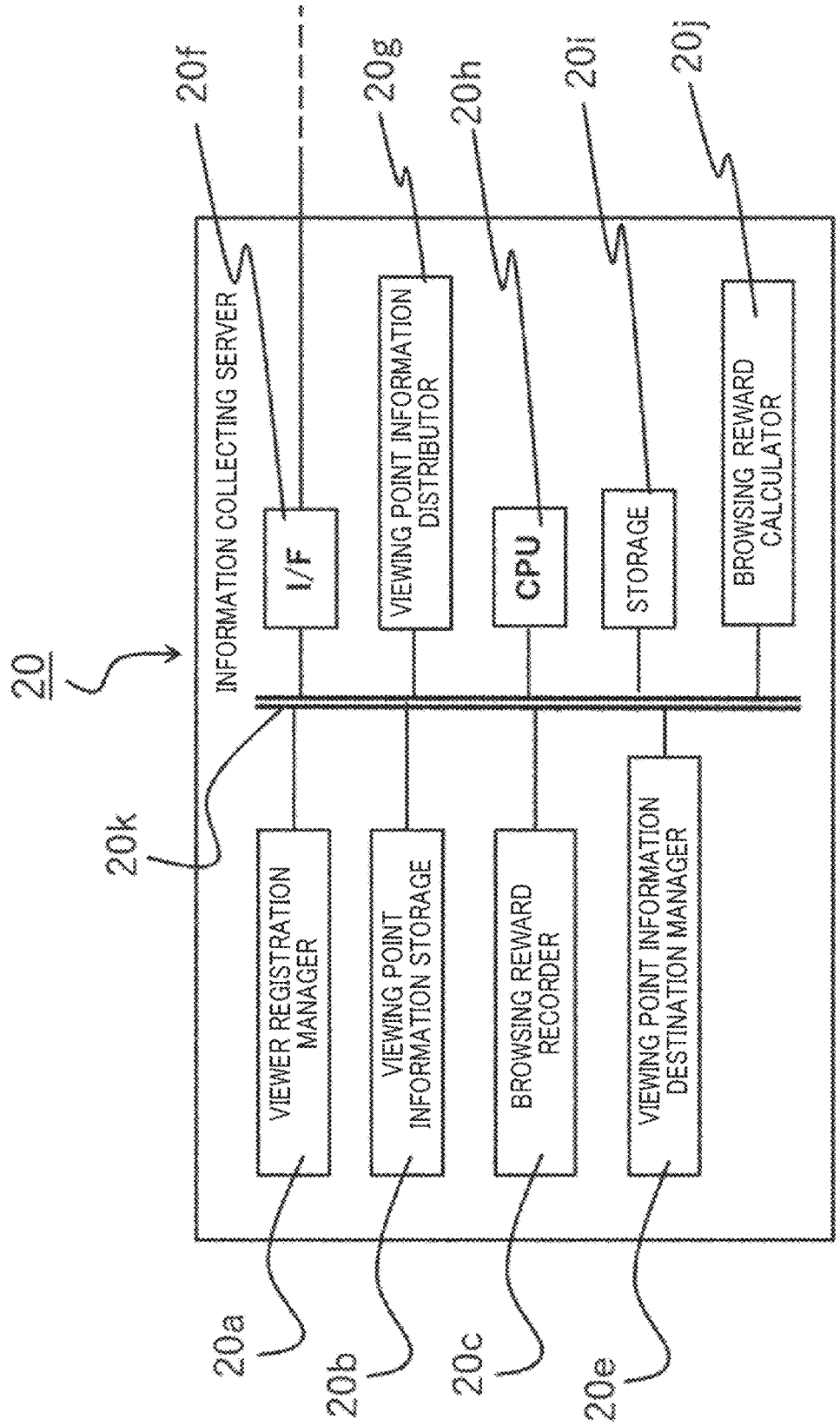
FIG. 4 is a configuration diagram of an information collecting server included in the viewing point information collecting system in FIG. 3.

Now, components of the information collecting server 20 of this system 3 will be described with reference to a diagram in FIG. 4 and an illustration of a recording form (e.g., a recording form related to viewing point information) in FIG. 5. FIG. 4 is a configuration diagram of an information collecting server included in the viewing point information collecting system in FIG. 3. FIG. 5 is an example recording form used by the viewing point information collecting system in FIG. 3. The information collecting server 20 includes a viewer registration manager 20a a viewing point information storage 20b, a browsing reward recorder 20c, a viewing point information destination manager 20e, an interface 20f, a viewing point information distributor 20g, a central processing unit (CPU) 20h, a storage 20i, a viewer browsing reward calculator 20j, and a bus line 20k.

The viewer registration manager 20a manages information on registered members who are web viewers using the smartphones 1 and permitted collection of the gaze point information. The manager stores e-mail records that are permitted collection of the viewing point information, which is personal information, by the system 3. As illustrated in FIG. 5, the manager stores, as basic information of each member, the account number (e.g., "123456" illustrated in FIG. 5) given by the system, the birth year and gender of the member (e.g., "1979, male" in the figure), the industry and department of the member (e.g., "pharmaceutical manufacturing and sales, sales department" in the figure), the family ("spouse, two sons, and one daughter" in the figure), hobbies ("fishing and camping" in the figure). Note that the items are not limited to those illustrated in FIG. 5 and may be selected as appropriate.

As an example, this system 3 employs personal authentication based on facial recognition when collecting the viewing point information. The reason is as follows. As will be described later, the member (i.e., the viewer) earns the reward for providing the viewing point information from the operator of the system 3, and the purchasers of the information utilize the attribute information on the viewers. The viewing point information needs to be viewed by the member him/herself. Besides the facial recognition, various biometrics recognition techniques such as iris recognition and fingerprint recognition or other recognition techniques may be employed as the personal authentication.

For the purpose, the viewer registration manager 20a stores data on face images, for example, used for the personal authentication.

The viewing point information storage 20b stores the viewing point information on each member (i.e., each web viewer) collected after obtaining the permission. As illustrated in FIG. 5, the storage stores the account number (e.g., "123456" illustrated in FIG. 5) of the viewer, the access date ("Aug. 1, 2018 in the figure) the access time ("every 5 seconds from 7 o'clock, 1 minute, 0 seconds), the uniform resource locator (URL) information ("https://XXX, https://YYY/ZZ") that is the accessed address, values of a coordinate of the viewing point on the display panel (i.e., the numerical values in a pixel unit from the coordinates of (0, 0) at the lower left of the display panel) ("(200 450), (50, 320), (100, 31)" in the figure). In practice, the items are not limited to those described above. In the illustration of FIG. 5, the viewer starts viewing the home page at 7 o'clock, 1 minute, 0 seconds, then focused on the same point on the home page for 10 seconds to 1 minute 15 seconds, and then moves to a sub-page.

The browsing reward recorder 20c stores, for each member, the compensation (i.e., the reward) when a registered viewer provides browsing information for gaining the reward under a contract. Upon request, the members can view the amounts of the stored reward. The rewards may be, for example, transferred to the bank accounts of the members under the prescription of the system, for example, at the end of every month.

The viewing point information destination manager 20e stores information not on members who provide browsing information but on users who purchase the browsing information from the system management company. The information includes, for example, the names of companies, the uniform resource locator (URL) information on the portal home pages of the companies, requirements of these company for the browsing information (e.g., information on visitors and viewers of the portal home pages of the companies or overall browsing information on the members who have attributes fitted as purchasers of the companies' products) or the times of transmitting information.

The interface 20f controls information transmission inside and outside the server 20. The viewing point information distributor 20g generates and transmits the browsing information according to requirements to the information purchasers stored in advance in the viewing point information destination manager 20e periodically or as appropriate. The information may be transmitted at each view of a URL designated in advance, for example.

A central processing unit (CPU) 20h controls various operations of the server 20. The storage 20i stores execution programs in addition to various data for operating the system 3. The viewer browsing reward calculator 20j calculates the reward in accordance with the results of collecting browsing information by the registered members. For example, the calculator calculates the amounts of reward on an hourly wage depending on the time periods of browsing and transmitting the browsing information. The bus line 9k connects the components inside the server 20 while allowing data exchange.

(Registration of Informant of Browsing Information)

Figure 6:
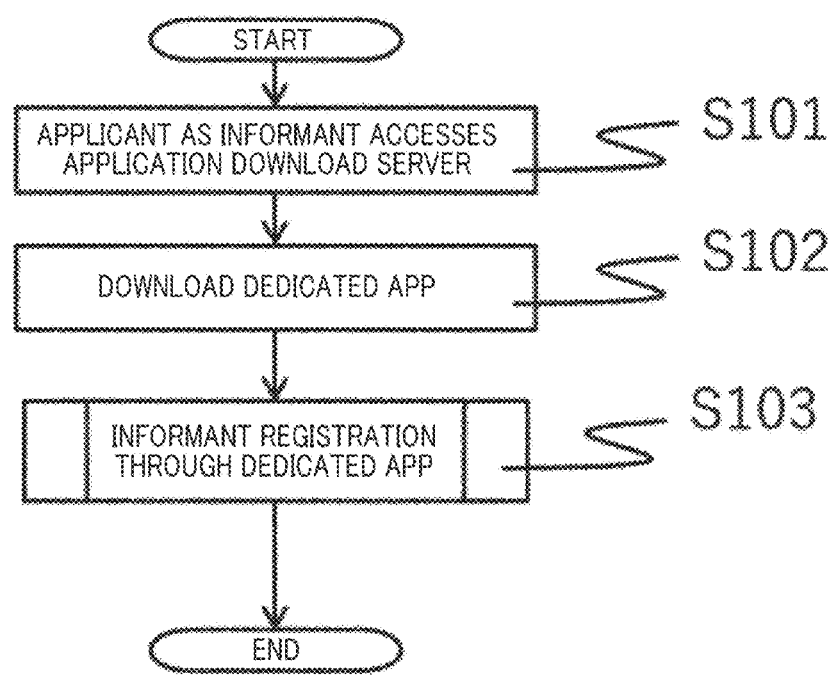
FIG. 6 is a flowchart of informant registration executed by the viewing point information collecting system in FIG. 3.
Figure 7:
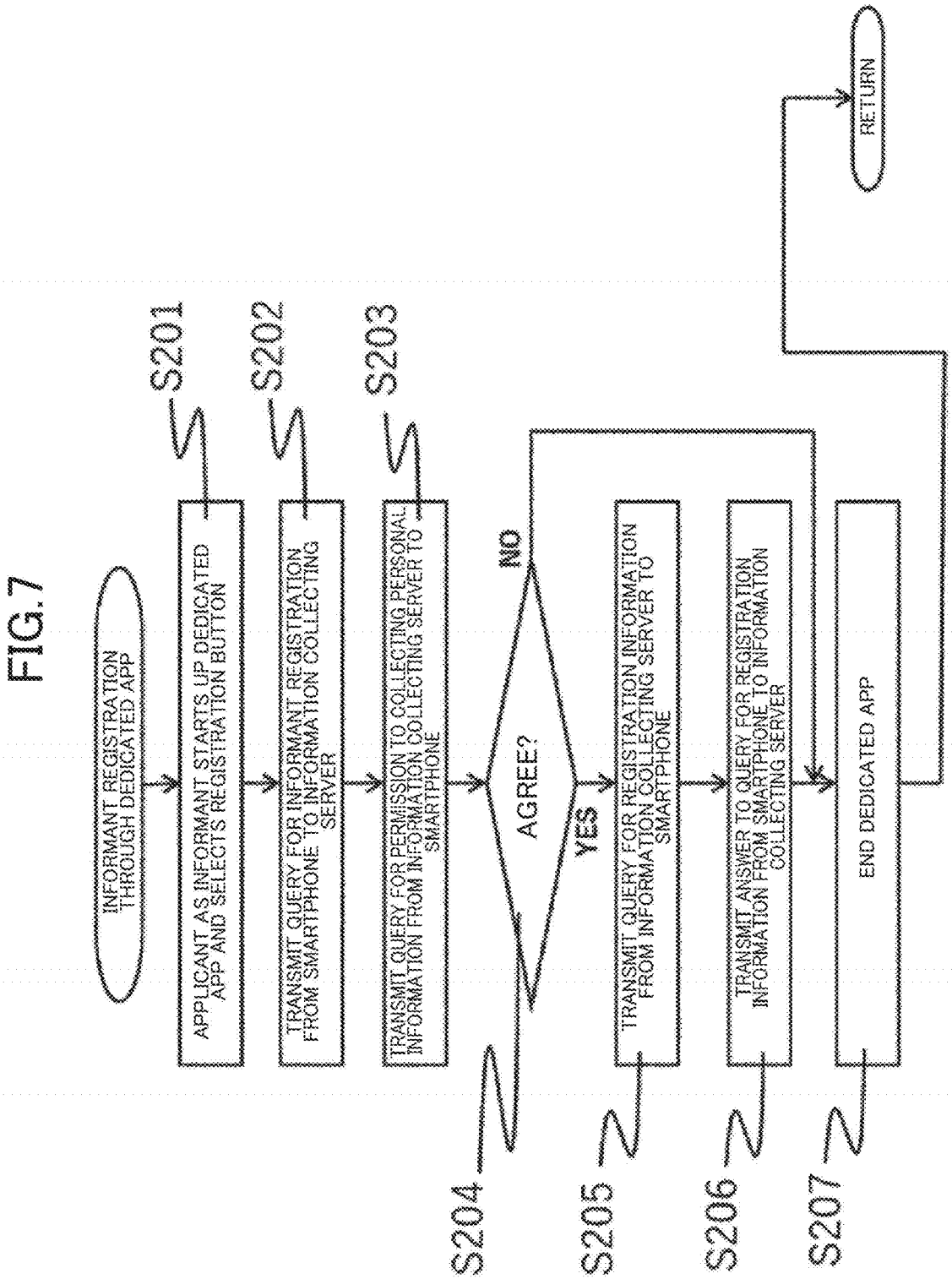
FIG. 7 is another flowchart of informant registration executed by the viewing point information collecting system in FIG. 3.

Now, with reference to the flowcharts in FIGS. 6 and 7, a procedure will be described where a person who is interested in a business registers first as an informant in the system 3. FIG. 6 is a flowchart of informant registration executed by the viewing point information collecting system in FIG. 3. For example, FIG. 6 shows a flow (or a first flow) of downloading a dedicated app for registration by an informant of viewing point information. FIG. 7 is a flowchart of informant registration executed by the viewing point information collecting system in FIG. 3. For example, FIG. 7 shows a flow (or a second flow) of downloading a dedicated app for registration by an informant of viewing point information.

In this embodiment, the registration is performed though a dedicated app for smartphones. An applicant as an informant who is interested in a business through advertisement or found a URL accesses a designated URL and downloads a dedicated app (steps S101 and S102).

Once the dedicated app starts up in this manner, a menu item for member registration is displayed on the smartphone 1. An applicant for registration selects the item (steps S103 and S201).

Once the item is selected, a query (e.g., a query text, a query signal, a request text, or a request signal which will be included in the term "query") indicating "Registration is requested as an informant of browsing information. A necessary entry form is to be transmitted" is transmitted from the smartphone 1 to the server 20 (step S202).

In response, first, the server 20 inquires of the smartphone 1 "The viewing point information that you will provide in the future corresponds to personal information. Do you agree?". For example, if the applicant agrees and clicks a button "Agree" displayed on the screen of the smartphone 1, a message record is, as a proof of the agreement, transmitted from the smartphone 1 to the server 20 and stored in the server 20 (steps S203 and S204). The reception of the query signal from the server 20 and the transmission of the permission or objection to the server 10 are controlled by the CPU 1h. That is, the CPU 1h receives and responds to the query signals from the server 20.

If the applicant disagrees, the dedicated app is shut down forcibly and the operation ends (steps S204 and S207).

If the applicant agrees, a registration information query of the individual applicant as illustrated in FIG. 5 is transmitted from the server 20 to the smartphone 1. The query filled out by the applicant is sent to and stored in the server 20. The dedicated app is then shut down forcibly (steps S205, S206, and S207).

(Collection of Viewing Point Information)

Figure 8:
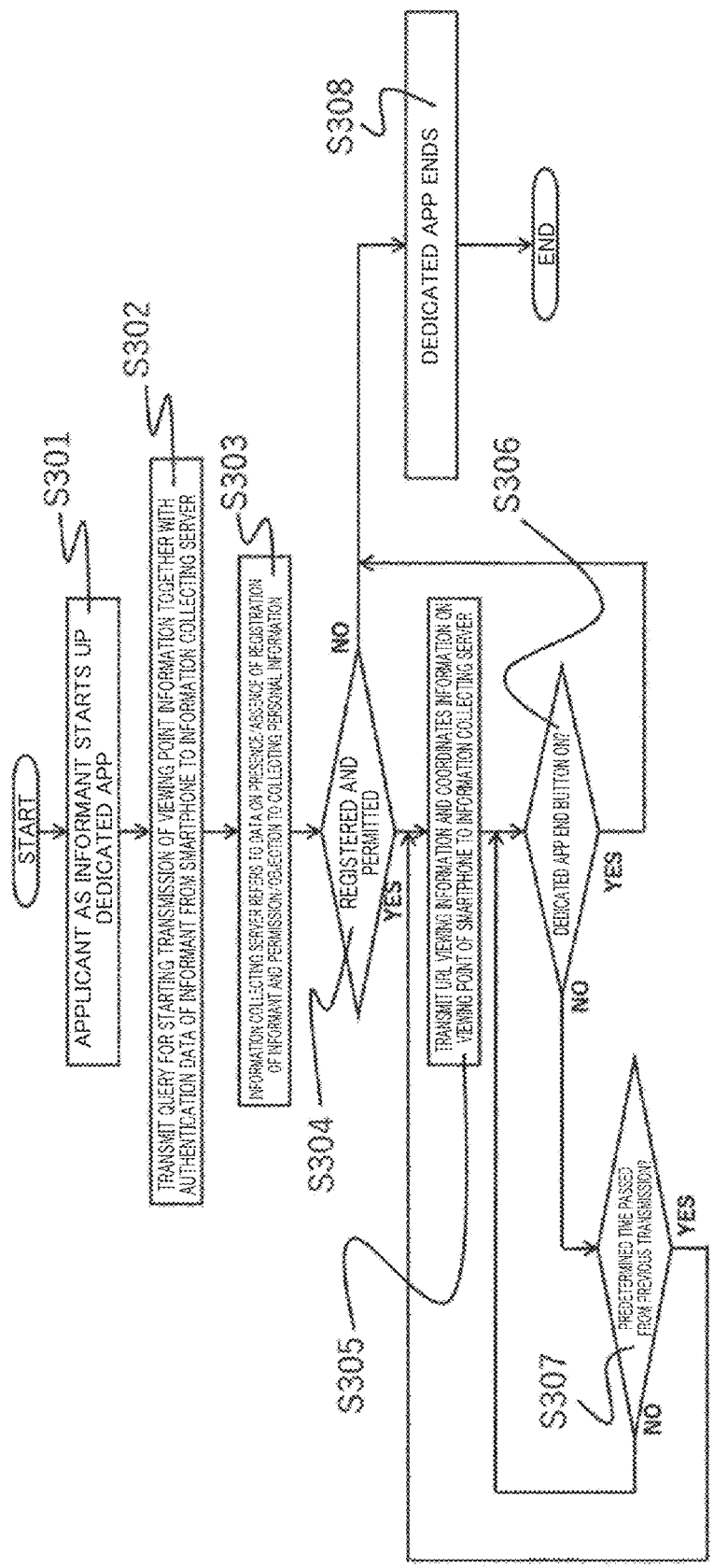
FIG. 8 is a flowchart of transmission of viewing point information by the viewing point information collecting system in FIG. 3.

Next a series of operation where the registered viewer transmits viewing point information at the time of his/her web browsing and respond to the request for collection by the server 20 will be described with reference to the flowchart (i.e., the flow of transmitting viewing point information through the dedicated app) in FIG. 8. FIG. 8 is a flowchart of transmission of viewing point information by the viewing point information collecting system in FIG. 3.

In this embodiment, the viewing point information is collected after a member has started the dedicated app Note that the time is not limited thereto. The viewing point information may always be transmitted to the server 20, while the member performs the web browsing on the smartphone 1. Not by the start-up of the dedicated app but by another operation, the viewing point information may be transmitted. In any case, the information is collected under an agreement of the member.

First, a member who wants to transmit browsing information starts up a dedicated app (step S301). After that, the front-facing camera 1b of the smartphone 1 captures an image of the face of the member (step S302). As described above, the facial recognition is performed, since only the member him/herself is permitted to view the website. Note that the member may be authenticated by a method other than the facial recognition. The image data for the facial recognition is transmitted from the smartphone 1 to server 20 together with a query for starting information transmission (step S302).

Even if the person has already been registered as an informant the server 20 may check the material proving (i.e., the message record indicating) the agreement to the information collection described above at each time of the information collection. This allows reliable confirmation of the intention of the member (steps S303 and S304).

Upon confirmation of the agreement of the member, the smartphone 1 (illustrated in FIG. 5) starts and continues transmitting the viewing point information, for example, for five seconds until the member stops the dedicated app (steps S305, S306, S307, and S308).

As a result, the server 20 stores the viewing point information associated with this member, which allows companies that have purchased the information for use as described above.

[Second Embodiment: Pull Information Collection]

What is called the "push information collection" has been described above in the first embodiment of the present invention where a viewer (or a member) who wants to provide viewing point information voluntarily transmits information any time he/she wants.

On the other hand, an information purchaser who wants to utilize browsing information may focus on the attributes of the viewing member and request to collect browsing information, for example, on females at a certain age or certain workers such as medical workers.

Assume that the server 20 receives the request for "collecting browsing information on medical workers. The server 20 may select only the medical workers from the information on the registered members and make a query "Is transmission of browsing information possible?" only to the members who are medical workers. In this case, the reward may be set high to motivate the members to transmit eye tracking information.

[Third Embodiment: Application to Personal Computer or Other Devices]

An example has been described in the embodiments where the smartphone 1 is a terminal used by a user who wants to provide eye tracking information that is the information on his/her eye track. The terminal is not limited to a smartphone but may by any personal digital assistant (PDA) or a personal computer. In use of such a personal computer, eye detection is performed by capturing images around the eyeballs of a member or based on learning by a neural network using results of capturing images of the member. For the eye detection, for example, a personal computer including built-in front-facing camera may use the front-facing camera, or a separate digital camera or a camera for a USB connection may be used.

[Fourth Embodiment: Embodiment without Application]

In the embodiments described above, a dedicated application program (e.g., a dedicated app for a smartphone) is installed in advance on a smartphone, a personal computer, or a PDA to be used, to transmit viewing point information.

In application of the present invention, a dedicated application program is not necessarily used.

For example, a program such as JavaScript may be executed in an information terminal of a viewer to invite the viewer viewing the home page display on a website to provide information, that is, to register as an informant of browsing information and transmit viewing point information. The present invention covers such a configuration.

[Fifth Embodiment: Obtainment of Viewing Point Information in 3D Space]

In the above description, the viewing point information (i.e., the eye track information) is based on coordinate information on a two-dimensional plane that is a display screen of a browsing information terminal.

In recent years, virtual objects such as items or avatars (i.e., representative objects for people) are placed in a virtual three-dimensional (3D) space, and this virtual 3D space including these objects may be distributed as contents to be viewed by a plurality of information terminals. Specifically, viewers of these contents may generate their avatars and put them into this 3D space to virtually join the contents.

Viewing point information may also be obtained on the objects in such a virtual or real 3D space or on coordinates.

Figure 9:
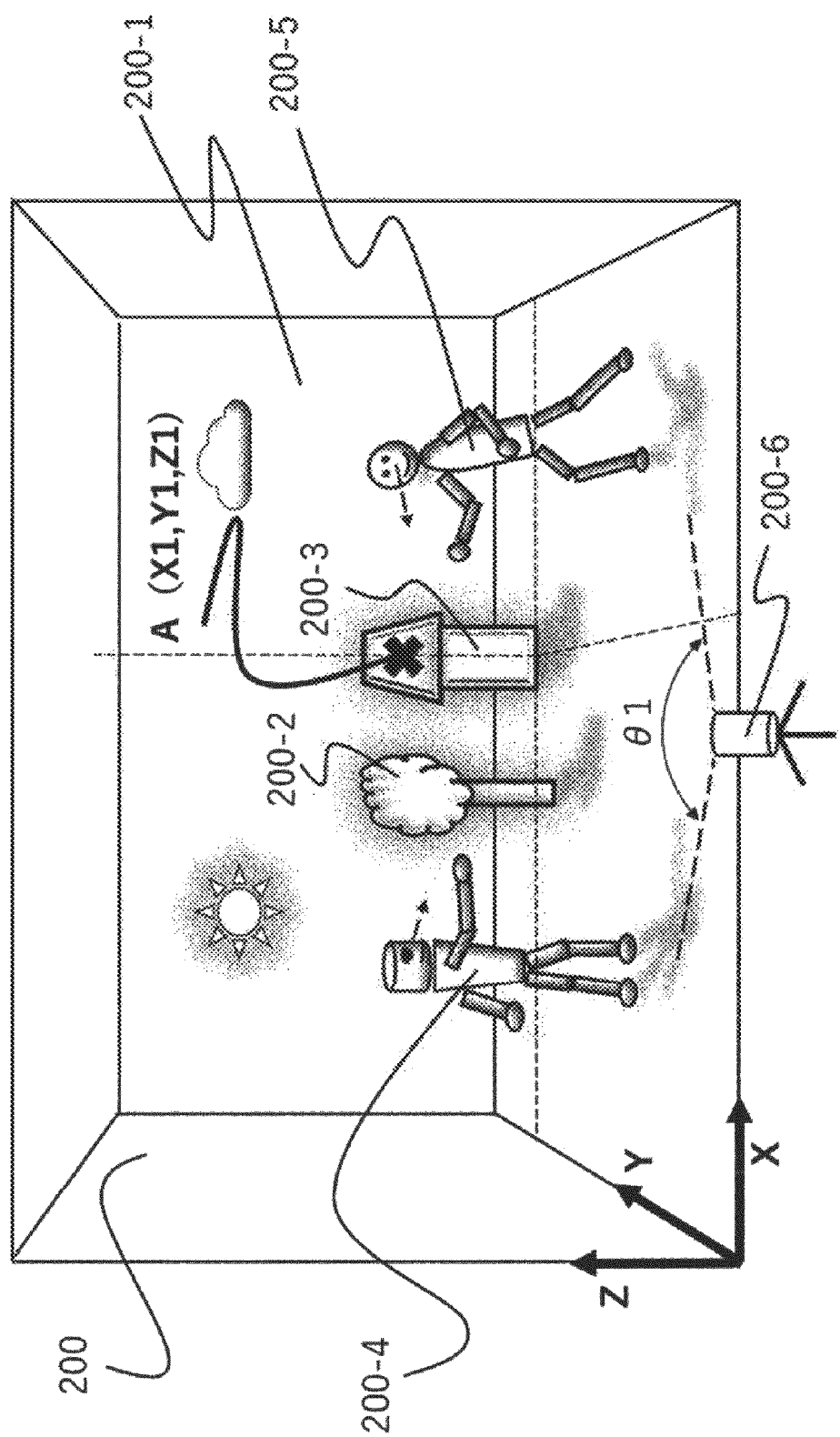
FIG. 9 is a schematic diagram of a 3D virtual space in illustrating another embodiment of the present invention.

FIG. 9 is a schematic diagram of a 3D virtual space for illustrating another embodiment of the present invention. FIG. 9 schematically shows an example of such a 3D virtual space including virtual objects. Placed in a 3D virtual space 200 are a background 200-1, an object (or a tree) 200-2, an object (or a house) 200-3, a first avatar 200-4, and a second avatar 200-5. This virtual 3D space is represented by three coordinate axes of the x-, y-, and z-axes.

Each object within the virtual space 200 has data on the appearance and on the position or orientation (the former may be referred to as "coordinate data" and the latter may be referred to as "bone data"). These data are stored in a personal computer used by an organizer who generates and distributes this virtual space 200, or in a server that distributes the virtual space data. The organizer transmits the appearance data and position or orientation data on these objects via the server, directly, or from the server to the information terminal (e.g., a personal computer or a smartphone) used by the viewer of this virtual space. The information terminal of each viewer performs rendering from the information on these objects to view the virtual space 200 using a display attached to the information terminal. The rendering may be performed by a terminal used by the distributor or a distribution server in addition to the terminal for viewing the data.

The rendering is performed in a specific point of view inside or outside the virtual space. The point of view may include, for example, the first avatar 200-4, the second avatar 200-5, or a virtual camera 200-6. Image rendering is performed from the respective points of view. The viewer may select a desired point of view out of these available points of view to perform rendering. If the system allows, an additional virtual camera (not shown) may be newly placed in a distinctive point of view inside or outside the space 200. An object in such a point of view may move.

Figure 10:
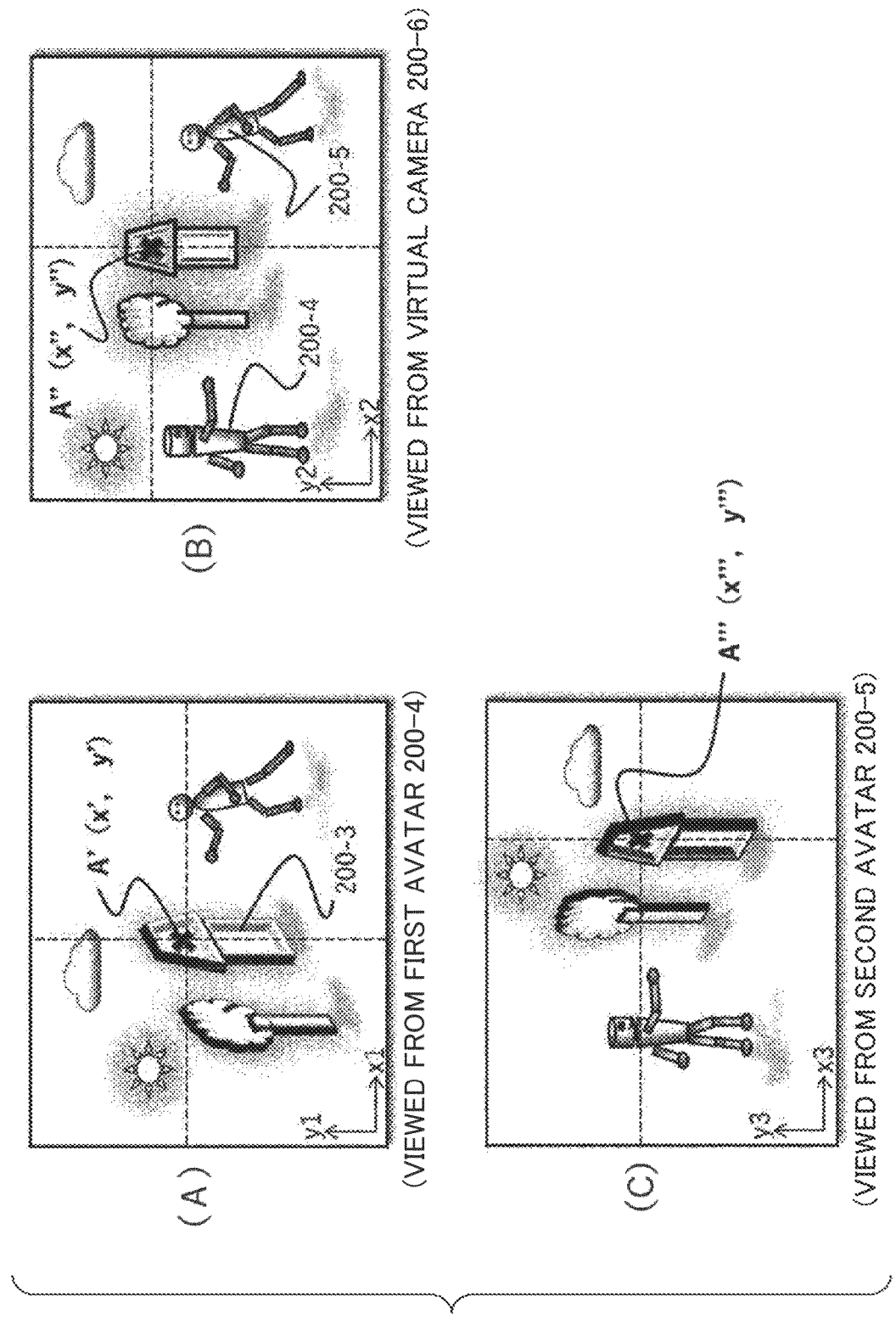
FIG. 10 is a schematic diagram of the image of the 3D virtual space in FIG. 9 from various points of view.

FIG. 10 is a schematic diagram showing images of the 3D virtual space in FIG. 9 from various points of view. FIG. 10 show example rendering images of the 3D virtual space in FIG. virtual space 200 from respective points of view, namely, the first avatar 200-4, the second avatar 200-5 and the virtual camera 200-6.

The image viewed from the first avatar 200-4 (see FIG. 10(A)) has a coordinate system represented by numerical values on two axes x1 and y1 from the origin at the lower of the display. Similarly, the image viewed from the second avatar 200-5 (see FIG. 10(C)) has a coordinate system represented by numerical values on two axes x3 and y3. The image viewed from the virtual camera 200-6 (see FIG. 10(B)) has a coordinate system represented by numerical values on two axes x2 and y2.

Assume that the viewer gazes a point A of the object (i.e., the house) 200-3 on the display of the information terminal used by the viewer shown in FIG. 9. Like the configurations described above in the embodiments, the system obtains, as the viewing point information, the values of the coordinate (x', y') of the point A' in the image (FIG. 10(A)) viewed from the first avatar 200-4, the values of the coordinate (x''', y''') of the point A''' in the image (FIG. 10(C)) viewed from the second avatar 200-5, and the values of the coordinate (x', y') of the point A'' in the image (FIG. 10(B)) viewed from the virtual camera 200-6.

Based on the values of the coordinate on the display of these rendering images, the coordinate of the A corresponding to the object (house) 200-3 in the 3D virtual space 200 as shown in FIG. 9 can be obtained as (X1, Y1, Z1) that are the values of the coordinate of the coordinate system representing values on the X-, Y-, and Z- axes described above. There are some methods. Since the points of view, eye directions, and virtual angles of view (or virtual focal lengths) of the first avatar 200-4, the second avatar 200-5, and the virtual camera 200-6 are given in advance. From the geometric calculation, the vector information on the line of sight, for example, from the first avatar 200-4 to the point A in the 3D virtual space 200. Similarly, the vector information on the line of sight from the second avatar 200-5 to the point A can be obtained. These two vectors of the lines of sight intersect each other at the point A.

The appearance and position data of the object (house) 200-3 are prepared in advance. For example, the line of sight from the first avatar 200-4 may intersect the position of this object (house) at the point A.

An example has been described above where the 3D values of the coordinate are defined in the 3D virtual space. The 3D values of the coordinate may be determined thorough the same or similar procedure in a real 3D space.

Recently, the home pages of most websites are created and displayed as 2D information. By contrast, if the home page of a website is created as 3D information, viewers' viewing point information can be generated through the procedure as described above in the 3D space. As a result, the 3D information provides the same or similar advantages as the 2D viewing point information.

[Fifth Embodiment: Embodiment Requiring No Transmission of Query Signals in Collecting Eye Tracking Information]

The following has been described above in the embodiments. Before the operator transmits his/her own eye tracking information to the server, the query signal (also referred to as a "query") indicating "Your eye tracking information is transmitted from this terminal to the server and collected. Do you agree?" from the server to the terminal used by the operator. If the operator who has seen this query makes an action indicating the permission (or acceptance), the fact that the operator has permitted to (or accepted) the provision of the information is transmitted as another signal from the used terminal to the server.

The present invention is implemented not necessarily by these embodiments and may be implemented as another configuration different from the example described above.

Specifically, assume that a smartphone is used as a terminal used by the operator. In this case, an application software (known as "app") for a smartphone for collecting eye tracking information is downloaded in advance in this smartphone. Before the download, the agreement action may be received from the operator.

Alternately, during or after the download of the application, the dedicated app installed on the smartphone may make an action requiring agreement as an essential menu item.

In any case, information indicating the fact that the operator has agreed may be recorded in a configuration for recording inside a smartphone. For example, the fact includes the action of the operator pressing the button "YES" (or may be "Agree", "Permit", or "Accept") displayed on a smartphone screen. The fact that the operator has made a permission action may be transmitted to a server for downloading the application, another reception configuration, or a server for collecting eye tracking information at a proper time. Alternatively, the information may be stored inside a smartphone used by the operator without being transmitted.

With this configuration, there is no need for the server manager operating the system and the operator providing eye tracking information to perform duplicated, redundant, complicated actions, which achieves efficient works.

Such configurations may be employed not only when using smartphone applications but when transmitting data or programs added to JavaScript for transmitting eye tracking information to smartphones and personal computers. Alternatively, such configurations may be employed when transmitting eye tracking information in any other way.

(Advantages of the Invention)

The present invention provides an information display terminal, an information transmission method, and a computer program that smoothly collect a large amount of information—although being personal information—as to where in a displayed content is specifically focused on by a viewer viewing delivered information displayed particularly on a web browsing device changeably from moment to moment, together with the information on the attributes of the viewers. The present invention can be implemented in various other forms, and various omissions, substitutions and changes can be made without departing from the spirit and scope of the invention. The embodiments and variations thereof are included within the scope and spirit of the invention as defined in the appended claims and the equivalents.

DESCRIPTION OF REFERENCE CHARACTERS

1 Smartphone
1b Front-Facing Camera
3 Viewing Point Information Collecting System
20 Information Collecting Server
40 Application Download Server

The invention claimed is:
1. An information display terminal comprising:
a display screen configured to display a web screen;
a gaze point detector configured to detect a gaze point position on the display screen by generating values of a coordinate of a position of a gaze point on the display screen in a line of sight of an operator who operates the information display terminal;
an operation receiver configured to receive a permission to collect content information from the operator on condition of payment of reward to the operator;
a camera configured to capture one or more images of the operator;
a processor configured to perform personal authentication of the operator based on the one or more images while collecting the content information, the content information including a date and time when the operator viewed the web screen, information on an address of the web screen, or information displayed at the coordinate of the gaze point position on the display screen that displays the web screen; and
an output unit configured to output, to a predetermined destination, the content information specifying a content displayed on the display screen in association with a result of detection of the gaze point position in a case where the permission is received from the operator and a confirmation is received from a server that the operator is a registered operator to receive the reward for providing the content information based on the personal authentication.

2. The information display terminal of claim 1, further comprising:
   a transmitter configured to transmit information on an attribute of the operator who has performed an operation of the permission.

3. An information transmission method comprising:
   displaying a web screen as a content by a display screen of an information display terminal;
   detecting a gaze point position on the display screen by a gaze point detector included in the information display terminal by generating values of a coordinate of a position of a gaze point on the display screen in a line of sight of an operator who operates the information display terminal;
   receiving a permission to collect content information from the operator on condition of payment of reward to the operator of the information display terminal by an operation receiver of the information display terminal;
   capturing one or more images of the operator;
   collecting the content information while performing personal authentication of the operator based on the one or more images; and
   outputting, to a predetermined destination, the content information specifying the content displayed on the display screen in association with a result of detection of the gaze point by an output unit included in the information display terminal in a case where the permission is received from the operator and a confirmation is received from a server that the operator is a registered operator to receive the reward for providing the content information based on the personal authentication,
   wherein the content information output from the output unit includes a date and time when the operator viewed the web screen, information on an address of the web screen, or information displayed at the coordinate of the gaze point position on the display screen that displays the web screen.

4. The information transmission method of claim 3, further comprising:
   transmitting information on an attribute of the operator who has performed an operation of the permission by a transmitter of the information display terminal.

5. A non-transitory computer-readable recording medium, storing a computer program that causes a processor to execute an information transmission method comprising:
   displaying a web screen as a content by a display screen of an information display terminal;
   detecting a gaze point position on the display screen by a gaze point detector included in the information display terminal by generating values of a coordinate of a position of a gaze point on the display screen in a line of sight of an operator who operates the information display terminal;
   receiving a permission to collect content information from the operator on condition of payment of reward to the operator of the information display terminal by an operation receiver of the information display terminal;
   capturing one or more images of the operator;
   collecting the content information while performing personal authentication of the operator based on the one or more images; and
   outputting, to a predetermined destination, the content information specifying the content displayed on the display screen in association with a result of detection of the gaze point by an output unit included in the information display terminal in a case where the permission is received from the operator and a confirmation is received from a server that the operator is a registered operator to receive the reward for providing the content information based on the personal authentication,
   wherein the content information output from the output unit includes a date and time when the operator viewed the web screen, information on an address of the web screen, or information displayed at the coordinate of the gaze point position on the display screen that displays the web screen.

6. An information display terminal comprising:
   a display screen configured to display a web screen;
   a gaze point detector configured to detect a gaze point position on the display screen by generating values of a coordinate of a position of a gaze point on the display screen in a line of sight of an operator who operates the information display terminal;
   a camera configured to capture one or more images of the operator;
   a processor configured to perform personal authentication of the operator based on the one or more images while collecting content information, the content information including a date and time when the operator viewed the web screen, information on an address of the web screen, or information displayed at the coordinate of the gaze point position on the display screen that displays the web screen;
   a permission action processor configured to store permission information indicating that the operator has permitted, in advance to output the content information, or transmit the permission information; and
   an output unit configured to output, to a predetermined destination, the content information specifying a content displayed on the display screen in association with a result of detection of the gaze point position, in accordance with the stored permission information and a confirmation received from a server that the operator is a registered operator to receive reward for providing the content information.

7. The information display terminal of claim 6, wherein the content information to the predetermined destination executed by the output unit includes information on an attribute of the operator.

8. An information transmission method comprising:
   displaying a web screen as a content by a display screen of an information display terminal;
   detecting a gaze point position on the display screen by a gaze point detector included in the information display terminal by generating values of a coordinate of a position of a gaze point on the display screen in a line of sight of an operator who operates the information display terminal;
   capturing one or more images of the operator;
   collecting content information while performing personal authentication of the operator based on the one or more images, the content information includes a date and time when the operator viewed the web screen, information on an address of the web screen, or information displayed at the coordinate of the gaze point position on the display screen that displays the web screen;
   storing permission information indicating that the operator has permitted, in advance, to output the content information, or transmitting the permission information outside the information display terminal, by a permission action processor of the information display terminal; and outputting, to a predetermined destination, the content information specifying the content displayed on the display screen in association with a result of detection of the gaze point position by an output unit included in the information display terminal, in accordance with the stored permission information and a confirmation received from a server that the operator is a registered operator to receive reward for providing the content information.

9. The information transmission method of claim 8, wherein
the content information to the predetermined destination executed by the output unit includes information on an attribute of the operator.

10. A non-transitory computer-readable recording medium, storing a computer program that causes a processor to execute the information transmission method, comprising:
displaying a web screen as a content by a display screen of an information display terminal;
detecting a gaze point position on the display screen by a gaze point detector included in the information display terminal by generating values of a coordinate of a position of a gaze point on the display screen in a line of sight of an operator who operates the information display terminal;
storing permission information indicating that the operator has permitted, in advance, to output content information, or transmitting the permission information;
capturing one or more images of the operator;
collecting the content information while performing personal authentication of the operator based on the one or more images, the content information includes a date and time when the operator viewed the web screen, information on an address of the web screen, or information displayed at the coordinate of the gaze point position on the display screen that displays the web screen;
outputting, to a predetermined destination, the content information specifying the content displayed on the display screen in association with a result of detection of the gaze point position by an output unit included in the information display terminal, in accordance with the stored permission information and a confirmation received from a server that the operator is a registered operator to receive reward for providing the content information.

11. The non-transitory computer-readable recording medium of claim 5, the information transmission method further comprising:
transmitting information on an attribute of the operator who has performed an operation of the permission permitted in response to the query signal by a transmitter of the information display terminal.

12. The non-transitory computer-readable recording medium of claim 10, wherein the outputting to the predetermined destination by the output unit further includes outputting information on an attribute of the operator.

13. The information display terminal of claim 1,
wherein the camera is further configured to capture images around eyeballs of the operator, and
wherein the gaze point detector is further configured to detect an eye direction of the operator based on the images around eyeballs of the operator to generate the values of the coordinate of the position of the gaze point on the display screen in the line of sight of the operator.

14. The information display terminal of claim 13, wherein the camera is further configured to collect biometric information of the operator for the personal authentication.

15. The information transmission method of claim 3, further comprising:
capturing images around eyeballs of the operator; and
detecting an eye direction of the operator based on the images around eyeballs of the operator to generate the values of the coordinate of the position of the gaze point on the display screen in the line of sight of the operator.

16. The information transmission method of claim 15, further comprising:
collecting biometric information of the operator for the personal authentication.

17. The non-transitory computer-readable recording medium of claim 5, the information transmission method further comprising:
capturing images around eyeballs of the operator; and
detecting an eye direction of the operator based on the images around eyeballs of the operator to generate the values of the coordinate of the position of the gaze point on the display screen in the line of sight of the operator.

18. The information display terminal of claim 6,
wherein the camera is further configured to capture images around eyeballs of the operator, and
wherein the gaze point detector is further configured to detect an eye direction of the operator based on the images around eyeballs of the operator to generate the values of the coordinate of the position of the gaze point on the display screen in the line of sight of the operator.

19. The information transmission method of claim 8, further comprising:
capturing images around eyeballs of the operator; and
detecting an eye direction of the operator based on the images around eyeballs of the operator to generate the values of the coordinate of the position of the gaze point on the display screen in the line of sight of the operator.

20. The non-transitory computer-readable recording medium of claim 10, the information transmission method further comprising:
capturing images around eyeballs of the operator; and
detecting an eye direction of the operator based on the images around eyeballs of the operator to generate the values of the coordinate of the position of the gaze point on the display screen in the line of sight of the operator.

21. The non-transitory computer-readable recording medium of claim 5, further comprising performing the personal authentication of the operator based on facial recognition.

22. The non-transitory computer-readable recording medium of claim 10, further comprising performing the personal authentication of the operator based on facial recognition.

* * * * *